United States Patent Office 3,502,491
Patented Mar. 24, 1970

3,502,491
METHOD OF MASKING EDGE OF GLAZED CERAMIC TILES
William H. Orth, Baltimore, Md., assignor, by mesne assignments, to SCM Corporation, New York, N.Y., a corporation of New York
No Drawing. Filed Aug. 2, 1967, Ser. No. 657,789
Int. Cl. C03c 1/00, 5/00; B44d 1/52
U.S. Cl. 117—5.5                               7 Claims

ABSTRACT OF THE DISCLOSURE

A process for the manufacture of glazed ceramic articles is described. An aqueous dispersion of a virtually ashless resin, having a decomposition temperature below that at which a glaze slip is converted to ceramic glaze, is applied to at least the edges of an unfired, planar clay body to strengthen the body during further handling. A glaze slip is then applied to the surface of the body by the waterfall method with some of the slip overrunning onto the resin treated edges. The overrun deposit is then mechanically removed without damage to the unfired body. The clay body is then fired at a temperature sufficient to convert the slip to ceramic glaze thus producing a glazed body with unglazed edges.

---

The invention relates to the manufacture of glazed ceramic articles and, more particularly, relates to an improvement in a conventional process in which ceramic glaze slip is applied to a fired ceramic article by the waterfall method.

The invention is advantageous in that it provides a process in which ceramic glaze slip is applied to the surface of an unfired, pressed clay body by the waterfall method and the clay body is converted without damage to the glazed ceramic article which has a glazed surface free of imperfections.

The invention provides an improved process for manufacturing essentially planar glazed ceramic stock by applying glaze slip to a ceramic body by the waterfall method. The improvement comprises:

(A) Applying to at least the edges of an unfired essentially planar pressed clay body, the edges of which are to finish unglazed, an aqueous dispersion of a virtually ashless resin sufficiently polar to permit wetting of the treated surface with glaze slip thereby forming a resinous coating on said body and strengthening the body for further treatment:

(B) Applying glaze slip by the waterfall method to the surface of said body whereby at least a portion of said edges are coated with said slip by virtue of overrun deposit of said slip from the planar surface;

(C) Mechanically removing said overrun deposit from said edges thereby forming a trimmed body; and (D) Firing said trimmed body.

By so proceeding, glazed ceramic articles such as, for example, ceramic tiles or bricks can be readily and economically manufactured without firing the pressed clay body prior to application of the glaze slip.

The waterfall method of manufacturing glazed ceramic articles is well known. In this method a pressed clay body is first fired in a furnace or kiln and then contacted with a flowing stream of glaze slip which splashes over the surface of the fired clay bisque which is, after contact with the slip, again fired in a furnace or kiln to convert the slip coating on the bisque into a glazed ceramic surface. Where the clay article is planar, such as, for example, ceramic tile or brick, it is generally desirable to glaze only the planar surface since the glazing of the edges of these articles will prevent adhesion of the motor or grout used to cement the tile or brick in place. It is virtually impossible to remove glaze slip from the edges of unfired planar articles without physically damaging the edges of the article and/or affecting the glaze slip coating on the planar surface.

In the conventional waterfall process, when a planar, fired clay body is contacted with glaze slip an overrun deposit of slip is invariably deposited on the edges and the underside of the body and the deposit must be mechanically removed from the edges and underside prior to glaze-firing the slip-coated clay body to provide ceramic articles having unglazed edges.

When an unfired, pressed clay body is subjected to the waterfall method of applying the glaze slip, the unfired, pressed body is invariably physically damaged during the removal of the overrun deposit from the edges thereof due to the frangible nature of the "green" or unfired, pressed clay body and pressed clay articles are conventionally clay body and pressed clay articles are conventionally fire-hardened prior to the application of glaze slip to make possible the mechanical removal of the overrun deposit of slip without physically damaging the clay article.

Attempts have been made to prevent overrun deposit of glaze slip from accumulating on the edges of unfired, pressed clay articles. Such attempts have comprised coating the edges of the "green" pressed clay article with a glaze slip repellent material such as paraffin or microcrystalline wax to eliminate the necessity for mechanically removing the overrun deposit. Such procedures have been found generally undesirable because some of the paraffin or micro-crystalline wax is almost always, albeit inadvertently, deposited on the surface of the pressed clay body and when ceramic glaze slip is applied to such surface a defect in the fired ceramic glazed surface of the finished ceramic article invariably results. The conventional waterfall method of ceramic glazing thus involves two firing steps, one prior to and one after the application of the glaze slip to the clay body.

Other processes for applying glaze slip include brushing or spraying the slip on the surface of fired or unfired clay bodies, thereby controlling the flow of slip and preventing or minimizing the overrun deposit of the slip on the edges of the body or article. Such processes are time-consuming and often result in an uneven or wavy thickness of glaze slip coating and therefore the finished glazed surface. Also, these processes are generally more inefficient than the waterfall method despite the use of a single firing step. Further, in such processes portions of the pressed clay body to which glaze slip is applied are often accidentally damaged or broken during the spray operation due to the frangible nature of the pressed clay.

It has presently been found that the application of an aqueous dispersion of certain fugitive or decomposable resins to at least the edges of an unfired, pressed clay body will prevent damage to the body during the waterfall glaze application and during the mechanical removal of the overrun deposit of the slip from the edges of the body. Moreover, if suitable resin despersions are used the resin application does not adversely affect the finished glaze surface after the clay body has been fired. The reason for the action of the resin in preventing damage to the pressed clay body is not known with certainty but it is believed that the resin exerts a surface hardening influence on the clay body which provides physical support for the greater portion of the interior frangible mass of the pressed clay body which is not contacted with the resin.

The aqueous dispersion of the resin may be applied to the unfired, essentially planar pressed clay body in any manner which will insure a partial to complete coverage of the surfaces of the body and particularly the edge surfaces of the pressed clay body. Thus, the aqueous resin dispersion may be applied to the clay body by brushing, rolling or spraying the resin on the clay body or by dipping the pressed clay body into a bath of the resin and thereafter applying the glaze slip to the resin treated, pressed clay body. Mechanical removal of the hereinbefore referred to overrun deposit of glaze slip from the edges of the body or article is readily accomplished without damage to the article. The glaze slip can then be applied to the clay body by the waterfall method and the clay body can, after mechanical removal of the overrun deposit, be fired to produce a planar glazed ceramic article which is substantially free of glazed surface imperfections.

The resin of the aqueous resin dispersion should be a virtually ashless resin and should be a resin which undergoes decomposition at a temperature substantially below that of the temperature at which the slip is converted to ceramic glaze (e.g., a temperature below about 1000° F.). If the resin is not ashless or is not thermally decomposable below the aforementioned temperature the ceramic glazed surface will contain imperfections or the bonding of the glaze finish to the bisque will be adversely affected. The resin dispersion should also be a dispersion which is sufficiently polar when wet or dried in a film to permit the wetting of the resin treated surface of the clay article with the glaze slip. In other words, the resin film or coating should be one which will form a continuous interface between the glaze slip and the resin coating and should not repel the liquid glaze slip when the latter is applied to the clay body.

The resin film should actually comprise a virtually ashless resin which will at least partially absorb the liquid (i.e., aqueous) phase of the glaze slip. If the resin does not have such properties of polarity, partial absorption, and the like, the finished ceramic glazes obtained after firing of the glaze slip coated clay body will be imperfectly bonded to the bisque or the glaze will be irregular in thickness.

The term "ashless" or "virtually ashless" as used herein is intended to mean and to refer the resins which, upon decomposition, leave little, if any, residue. Such resins are free or substantially free of metals, metal salts or high melting non-metallic materials. These resins, when applied to green, pressed clay articles, form films which decompose from a solid phase into a gaseous or vapor phase below conventional glaze firing temperatures. The vapors are discharged through the glaze slip film without interfering with the continuum of the glaze slip film or affecting the continuity or adhesion of the glaze slip film to the pressed clay. After the glaze firing step a smooth adherent glaze finish of even thickness is obtained without damage to the ceramic stock.

A wide variety of virtually ashless resins may be employed in the aqueous resin dispersion including, for example, polyvinyl alcohol; esters of polyvinyl alcohol such as polyvinyl acetate, polyvinyl butyrate, etc.; acrylic resins such as methacrylate, methylmethacrylate, ethylacrylate, ethylmethacrylate, propylacrylate and the like; acrylamide resins including acrylamide, ethylacrylamide, vinylacrylamide, etc.; alkyd resins which are the reaction products of polyhydric alcohols and polycarboxylic acids which have free hydroxyl groups in their molecules; resins obtained from natural products such as, for example, ethyl cellulose and carboxymethyl cellulose; mixtures of the foregoing resins and copolymers of same. Other resins include conventional water-reducible aqueous film-forming latices. Generally the resins should be hydrophilic rather than hydrophobic since hydrophobic resins are not sufficiently polar to permit wetting of the resin-treated clay body surface with the glaze slip.

Of the foregoing resins, polyvinyl alcohol and polyvinyl esters, such as polyvinyl acetate, have been found to be particularly advantageous for use in the resin dispersions in that they are ashless, readily undergo thermal decomposition, are inexpensive and protect the unfired, pressed clay bodies from disintegration during mechanical removal of the overrun deposit of glaze slip from the edges of the clay body.

The amount of resin employed in the aqueous resin dispersion may vary to some extent depending upon the particular glaze slip which it is desired to employ. Generally, an aqueous dispersion containing from about 0.5 to about 10 weight percent of any the above-mentioned resins can be employed. If dispersions containing less than 0.5 weight percent resin are employed, the pressed clay body will sometimes be too frangible and can be damaged during the removal of the overrun deposit of glaze slip from the edges of the body. On the other hand, if a dispersion containing more than about 10 weight percent is employed, the dispersion will sometimes be unduly viscous and the pressed clay body will require prolonged firing times during the glaze firing step to completely decompose the resin during the glazing operation. As will be evident from the specific examples, dispersions containing from between about one to about 6 weight percent resin have been found to be especially advantageous since such dispersions form films which prevent mechanical disintegration of the pressed clay body and have a viscosity which permits easy application of the dispersion to the pressed clay body.

Although the glaze slip can be applied to the unfired resin coated clay body immediately after application of the resin to the body, it has been found generally preferable to at least partially dry the body prior to the application of the glaze slip since partial to complete drying tends to insure physical integrity of the pressed clay body during the mechanical removal or trimming of the glaze slip overrun deposit from the edges of the pressed clay body.

In a preferred embodiment of the process improvement of this invention, it has been found possible to produce glazed ceramic articles by merely applying the resin dispersion to the edges of the pressed clay article, rather than applying the dispersion by an immersion dip, since it is the edges that are usually subjected to mechanical stress during removal of the overrun deposit of glaze slip. Since the entire pressed clay body can be immersed in the resin, inadvertent spillage of drops or droplets of resin on the planar surface of the unfired clay body during the edge treatment will not result in imperfections of the finished glaze, provided that the aqueous resinous dispersion contains resins hereinbefore described. The treatment of the edges (sometimes referred to as the edge-coating-step for convenience of description) can be readily accomplished by contacting the edges of the pressed, unfired, clay body by dipping or with a soft brush, roller, or sponge which is saturated with the aqueous resin dispersion. Since the glaze slip overrun deposit is usually randomly produced and is present on every edge of the pressed clay body, it is necessary to treat the entire edge surfaces of the body.

After the aqueous resinous dispersion has been applied to the pressed clay body (e.g., to the body or to at least the edges thereof), the pressed clay body is subjected to a "waterfall," that is, a flowing stream of glaze slip during which the planar surface of the pressed clay body is coated with the glaze slip and there results at least a partial coating of the edges and often of peripheral underside of the pressed clay article with the overrun deposit of glaze slip. Such overrun deposit is then mechanically removed by means such as, for example, wiping, washing, brushing, scraping, and the like after which the green, pressed clay articles are conventionally fired.

The following specific examples are intended to illustrate the invention but not to limit the scope thereof, parts and percentages being by weight unless otherwise specified.

EXAMPLE 1

Pressed clay articles of the formulae listed below were prepared by blending the formulary ingredients in the amounts set forth in Table 1 below in a double cone blender and then incorporating sufficient water (e.g., from about 6 to about 7 weight percent) to form a mixture which would hold together when the formulae were pressed in a clay tile mold at between 1000 and 2000 p.s.i.

TABLE I

| Ingredient | Percent | | |
|---|---|---|---|
| | Formula 1 | Formula 2 | Formula 3 |
| Talc (New York) | 70.0 | | 58.0 |
| Wollastonite | | 55.0 | 5.0 |
| Ball clay | 30.0 | 30.0 | 30.0 |
| Flint | | 15.0 | |
| Frit No. 4 [1] | | | 7.0 |

[1] See Table III for the formula of Frit No. 4.

EXAMPLE 2

An aqueous dispersion consisting of 600 grams of polyvinyl alcohol and 9400 grams of water was prepared by dispersing the polyvinyl alcohol into water and agitating the mixture until a uniform dispersion was obtained.

Fifty (50) green, pressed clay articles of each of the formulae described in Table I were immersed in the aqueous polyvinyl alcohol dispersion, immediately withdrawn therefrom, and permitted to dry.

EXAMPLE 3

Glaze slip formulations having solid ingredients in the proportions listed in Table II below were prepared by milling the ingredients in an aqueous dispersion consisting of 0.3 percent bentonite and 99.7 percent water. The milling slurry contained 50 weight percent dry materials and 50% aqueous slurry. The milling was continued until the particles were of a size such that less than 5 percent were retained on a 200 mesh screen. The resulting glaze slip compositions were then adjusted to a specific gravity of 1.75 by adding additional water.

TABLE II

| Ingredient | Glaze slip formulations (percent) | | |
|---|---|---|---|
| | Formula 1 | Formula 2 | Formula 3 |
| Frit No. 1 | 19.5 | | |
| Frit No. 2 | | 88.0 | |
| Frit No. 3 | | | 78.0 |
| Feldspar | 28.4 | | |
| Flint | 8.7 | | |
| Clay | 8.9 | 3.0 | |
| Zinc oxide | 9.6 | | 10.2 |
| Wollastonite | 14.3 | | |
| Barium carbonate | 1.0 | | |
| Opacifier | 9.6 | 9.0 | [1] 11.8 |

[1] Zirconium silicate.

The frit compositions employed in the glaze formulations are commercial articles of commerce having the compositions shown in Table III below.

TABLE III.—FRIT FORMULAE
[Dry basis]

| Ingredient | Percent | | | |
|---|---|---|---|---|
| | Frit No. 1 | Frit No. 2 | Frit No. 3 | Frit No. 4 |
| $K_2O$ | 0.3 | | 2.0 | 1.7 |
| $Na_2O$ | 8.5 | 3.6 | 1.9 | 14.7 |
| $CaO$ | 17.0 | 4.5 | 5.7 | 0.1 |
| $PbO$ | | 31.0 | 28.7 | |
| $Al_2O_3$ | 5.0 | 2.4 | 3.8 | 3.6 |
| $B_2O_3$ | 18.7 | 13.0 | 13.2 | 28.9 |
| $SiO_2$ | 50.0 | 43.5 | 41.2 | 51.0 |
| $ZrO_2$ | | 1.0 | 1.2 | |
| F | | | 2.3 | |

The 150 green tiles of Example 2 were passed through a "waterfall" of the glaze slip of Formula 1 to Table II immediately after water had been added to the glaze slip formula to adjust it to the desired specific gravity. The green tiles were placed on a movable belt underneath a flowing stream of the glaze slip. After passage through the waterfall it was observed that the edges and a portion of the undersides of the tiles had been coated with an overrun deposit of the slip on the tiles as the tiles passed through the waterfall. The overrun deposit was removed from the edges and the undersides of the tiles with a moistened sponge mounted on a circular wheel which contacted the edges and the undersurfaces of the tiles as they moved on the belt, thus removing the overrun deposit of glaze slip from the edges and the undersides of the tiles and providing 150 tiles having a glaze slip coating on the smooth top surfaces of the tiles. Thereafter, the tiles were placed in a conventional glazing furnace and heated at a temperature of about 2000° F. for 1 hour. The tiles were then removed from the furnace, cooled and examined. All the tiles exhibited an even adherent glazed surface and there was no indication of any damages to the edges, the spacer lugs on the edges or to the undersides of the tiles.

EXAMPLE 4

The procedure of Example 3 was repeated except that, instead of immersing pressed clay tile bodies into the resin, the edges and the undersides of the green tiles were treated with the resin by contacting the edges with a soft sponge impregnated with the resin dispersion. After drying and waterfall contact of the tiles with the glaze slip formulation number 2 (shown in Table II) and firing the tiles as described in Example 3 substantially the same results were obtained. In no instance was there damage to the surface or the edges of the tiles.

EXAMPLE 5

The procedure of Example 2 was repeated except that the green, pressed, clay tiles were immersed in an aqueous resin dispersion consisting of 600 grams of polyvinyl acetate and 9400 grams of water in place of the polyvinyl alcohol resin dispersion employed in that example. Subsequent treatment of the resin treated green tiles using the procedure of Example 3 resulted in glazed clay tiles of excellent quality in which the edges and the undersides were unglazed and undamaged.

EXAMPLE 6

The procedure of Example 5 was repeated except that the edges and undersides of the tiles were treated with the polyvinyl acetate dispersion using the edge-coating procedure described in Example 4. Again, tiles of excellent quality with undamaged edges and underside surfaces were obtained. When the procedures of Examples 5 and 6 were repeated using a dispersion of paraffin oil to immerse and edge-coat green clay tiles the glaze slip did not adhere well to any of the surfaces of the tiles and the finished glazed tiles had an uneven surface and blemishes where drops of the paraffin emulsion had contacted the glaze top surface during the edge-coating operation.

EXAMPLE 7

The procedure of Example 4 was repeated except that the glaze slip Formula 3 of Table II was employed in place of the glaze slip Formula 1 employed in Example 3. In each instance glazed tiles of excellent quality were obtained.

When the procedures of the foregoing examples were repeated without immersing green tiles or edge-coating green tiles with the resin, each tile had damaged edges and the spacer lugs were broken in almost every instance.

What is claimed is:

1. In a process for manufacturing essentially planar, glazed, ceramic stock by applying glaze slip to a ceramic body by the waterfall method, the improvement which comprises:

(A) applying to at least the edges of an unfired essentially planar pressed clay body, the edges of which are to finish unglazed, an aqueous dispersion of a virtually ashless resin, having a decomposition temperature below that at which the slip is converted to ceramic glaze, said resin being sufficiently polar to permit wetting of the treated surface with glaze slip thereby forming a resinous coating on said body and strengthening the body for further treatment;

(B) applying glaze slip by the waterfall method to the surface of said body whereby at least a portion of said edges are coated with said slip by virtue of overrun deposit of said slip from the planar surface;

(C) mechanically removing said overrun deposit from said edges thereby forming a trimmed body; and (D) firing said trimmed body at a temperature and for a time sufficient to convert the slip to ceramic glaze.

2. The process of claim 1 wherein said aqueous dispersion of said resin contains from about one to about 10 weight percent of resin.

3. The process of claim 2 wherein said resin is selected from the group consisting of polyvinyl alcohol, esters of polyvinyl alcohol, acrylic resins, acrylamide resins, alkyd resins, mixtures thereof, and copolymers of same.

4. The process of claim 3 wherein said resin is polyvinyl alcohol.

5. The process of claim 3 wherein said resin is polyvinyl acetate.

6. The process of claim 1 wherein said aqueous dispersion of said resin is at least partially dried prior to applying glaze slip.

7. The process of claim 1 wherein said overrun deposit is removed from the edges of said clay body by contacting said body with water.

References Cited

UNITED STATES PATENTS

| | | | |
|---|---|---|---|
| 3,068,114 | 12/1962 | Ranby | 117—55 |
| 2,931,751 | 4/1960 | Du Fresne | 117—125 X |
| 2,062,865 | 12/1936 | Cleveland | 117—123 X |
| 1,168,882 | 1/1916 | Hasburg | 117—125 X |

ALFRED L. LEAVITT, Primary Examiner

A. GRIMALDI, Assistant Examiner

U.S. Cl. X.R.

117—38, 8.5, 123, 125